United States Patent [19]

Tadokoro

[11] Patent Number: 5,218,586
[45] Date of Patent: Jun. 8, 1993

[54] OPTICAL RECORDING AND REPRODUCING APPARATUS

[75] Inventor: Michihiro Tadokoro, Amagasaki, Japan

[73] Assignee: Mitsubishi Denki Kabushiki Kaisha, Tokyo, Japan

[21] Appl. No.: 943,999

[22] Filed: Sep. 11, 1992

Related U.S. Application Data

[63] Continuation of Ser. No. 499,632, Mar. 27, 1990, abandoned.

[30] Foreign Application Priority Data

Apr. 17, 1989 [JP] Japan .................................. 1-95197

[51] Int. Cl.$^5$ .............................................. G11B 7/00
[52] U.S. Cl. .............................. 369/44.14; 369/44.11
[58] Field of Search ............... 369/44.14, 44.11, 44.17, 369/112, 44.35, 44.36, 32, 124, 116, 54, 58, 44.32, 107

[56] References Cited

U.S. PATENT DOCUMENTS 4,363,961 12/1982 Okada et al. ..................... 250/201
4,712,887 12/1987 Baer .

FOREIGN PATENT DOCUMENTS 295572 12/1988 European Pat. Off. .
61-198444 1/1987 Japan .
62-95743 10/1987 Japan .

Primary Examiner—Jeffery A. Brier
Assistant Examiner—Robert Chevalier
Attorney, Agent, or Firm—Leydig, Voit & Mayer

[57] ABSTRACT

An optical recording and reproducing apparatus includes a light source for generating a parallel beam. A movable optical system condenses the parallel beam from the light source on the disk, splits the beam reflected by the disk into a first and a second beam, spatially inverts the second beam, and moves in the radial direction of the disk. A first split-beam detecting device has two light receiving surfaces which receive the first beam. A second split-beam detecting device has two light receiving surfaces which receive the second beam inverted in the movable optical system. A control device performs tracking control by moving the movable optical system in the radial direction of the disk in accordance with detection signals output from the first and second split-beam detecting devices.

17 Claims, 12 Drawing Sheets 15b  15  15a 105b  105  105a 15b  15  15a 105b  105  105a

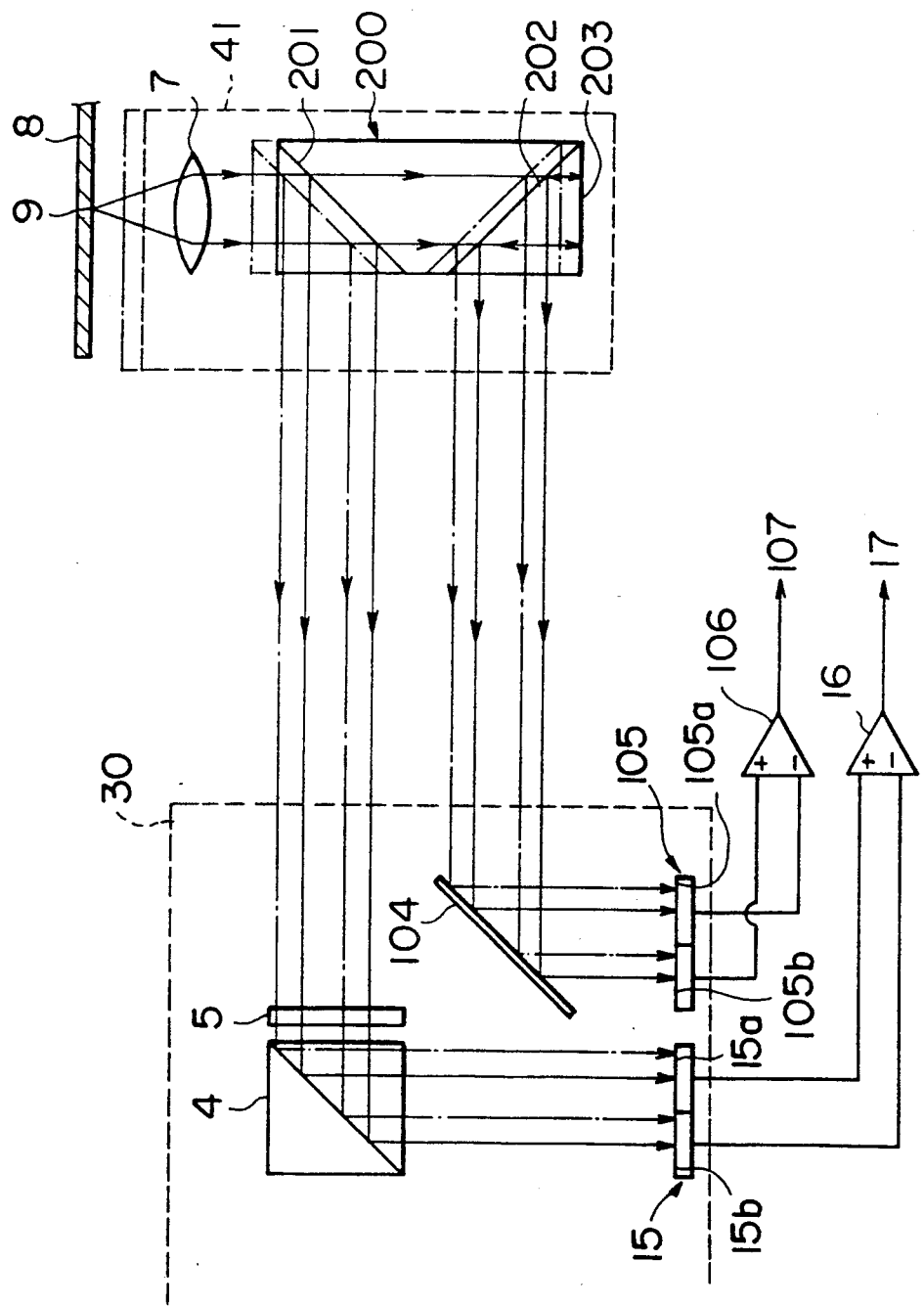

15b　15a
　15

15b　15a
　15

OPTICAL RECORDING AND REPRODUCING APPARATUS

This application is a continuation of application Ser. No. 07/499,632, filed Mar. 27, 1990 now abandoned.

BACKGROUND OF THE INVENTION

1. Field of the Invention

This invention relates to an optical recording and reproducing apparatus, and in particular, to an optical recording and reproducing apparatus using a separate-type optical head which is divided into a stationary optical system and a movable optical system.

2. Description of the Related Art

FIG. 9 shows a conventional optical recording and reproducing apparatus which is disclosed in Japanese Laid-Open Patent No. 62-95743. The illustrated apparatus comprises a stationary optical system 20 and a movable optical system 24. The stationary optical system 20 includes a semiconductor laser 2, a polarizing beam splitter 4, a quarter-wavelength plate 5, a half mirror 10, a convex lens 11, a cylindrical lens 12, a knife edge 13, and split-beam detectors 14 and 15. The movable optical system 24 includes a lens carriage 21 on which a launching mirror 6 and an objective lens 7 are mounted, an electromagnetic driving means 22, and a rail 23, the lens carriage 21 being moved along the rail 23 by the electromagnetic driving means 22.

Next, the operation of this conventional optical recording and reproducing apparatus will be described. First, the semiconductor laser 2 is driven by means of a laser-drive power source 1. The semiconductor laser 2 then emits a laser beam, which is converted to a parallel beam by a collimating lens 3. The parallel beam is then transmitted as P-polarized light through the polarizing beam splitter 4, the quarter-wavelength plate 5, and the launching mirror 6 before it reaches the objective lens 7. The beam is then condensed on a disk 8 as a condensation spot 9 having a diameter of about 1 µm. The beam is then reflected by the disk 8 and is transmitted through the objective lens 7 to become a parallel beam. This parallel beam is reflected by the launching mirror 6 before being transmitted through the quarter-wavelength plate 5. As a result of being transmitted both ways through the quarter-wavelength plate 5, the beam is rotated to S-polarized light and impinges upon the polarizing beam splitter 4, where it is reflected and led to the half mirror 10. The half mirror 10 divides the beam into two different beams. One of the beams is reflected by the half mirror 10 and is led to a focal-deviation detecting means which is composed of the convex lens 11, the cylindrical lens 12, the knife edge 13, and the split-beam detector 14. Since the principle of this focal-deviation detecting means is not directly related to this invention, a detailed explanation of it will be omitted. It should be added, however, that this focal deviation detecting means may be based on any well-known focus detecting method such as the knife-edge method, image rotation method, Foucault's method, or astigmatism method.

The output of this split-beam detector 14 is converted to a focal-deviation signal by a calculation circuit (not shown). An actuator (not shown) moves the objective lens 7 in the direction of the optical axis, controlling the condensation spot 9 in such a manner that it is constantly kept in focus on the disk 8.

The other beam, which is transmitted through the half mirror 10, is received by the split-beam detector 15, causing a differential circuit 16 to output a track-deviation signal 17. This signal is supplied to the electromagnetic driving means 22, which employs, for example, a well-known voice coil. The electromagnetic driving means 22 then moves the lens carriage 21 along the rail 23 in the radial direction of the disk 8, thereby effecting tracking control. The tracking control may also be performed by moving the objective lens 7 in the radial direction of the disk 8 by means of an actuator (not shown).

How track deviation is detected will be described in more detail. When, as shown in FIG. 10A or FIG. 10C, the condensation spot 9 is positioned in the middle of a guide groove (track) 8a or in the middle of an inter-groove section, the quantity of light incident on a light receiving surface 15a is the same as that incident on another light receiving surface 15b, as shown in FIG. 10E or FIG. 10G. However, when the condensation spot 9 deviates to one side of a guide groove, as shown in FIG. 10B, the quantity of light incident on the light receiving surface 15a (indicated by the shaded portion) is less than that incident on the light receiving surface 15b because of the diffraction attributable to the guide groove 8a, as shown in FIG. 10F. When the condensation spot 9 deviates to the other side of a guide groove, as shown in FIG. 10D, the quantity of light incident on the light receiving surface 15b (indicated by the shaded portion) is less than that incident on the light receiving surface 15a, as shown in FIG. 10H. Accordingly, on the basis of any difference in output between the two light receiving surfaces 15a and 15b, it can be detected whether or not the condensation spot 9 is correctly positioned with respect to a guide groove 8a as well as to which side of the guide groove 8a it has deviated. This tracking detection method is generally called the diffraction light method or push-pull method.

However, conventional optical recording and reproducing apparatuses as described above have the following problem. When the movable optical system 24 has been displaced in the vertical direction or when the axis of movement of the rail 23 is not exactly parallel to the optical axis of the parallel beam output from the stationary optical system 20, an offset is generated in the track-deviation signal as the movable optical system 24 moves along the rail 23.

A signal offset is also easily generated if the movable optical system 24 is displaced during its movement due to any dust or the like adhering to the rail 23.

This problem will now be discussed with reference to FIGS. 11, 12A, 12B, 13A and 13B. First, when in FIG. 11 the movable optical system 24 is in its initial position indicated by the dashed line, the launching mirror 6 is also in its initial position indicated by the solid line. The beam incident on the split-beam detector 15 in this state is indicated by the solid lines. FIG. 12A shows the manner in which beams are receive by the split-beam detector. The track-deviation detecting signal 17 obtained from the split-beam detector 15 is then set by initialization in such a manner that it exhibits no offset, as shown in FIG. 13A.

Next, if the movable optical system 24 is deviated upwards, by a distance d, as indicated by the chain line in FIG. 11, while moving along the rail 23, the launching mirror 6 is then also displaced upwards. As a result, the beam reflected by the disk 8 and led to the split-beam detector 15 deviates by the distance d. FIG. 12B shows how the beam is received by the split-beam detector 15 in this condition. Thus, an offset is generated in the track-deviation detection signal 17 as compared to the initial condition, as shown in FIG. 13B.

A similar offset is generated in the track-deviation detection signal 17 obtained from the split-light detector 15 when the movable optical system 24 is tipped. In that case, the beam reflected by the disk 8 and led to the split-beam detector 15 suffers a sideward deviation.

When an offset is thus generated in the track-deviation detection signal 17, the condensation spot 9 on the disk 8 cannot properly follow the guide grooves 8a, resulting in deterioration in the properties of apparatus concerned with the recording, reproducing or erasing of information.

SUMMARY OF THE INVENTION

This invention has been made with a view towards eliminating the above problem. It is accordingly an object of this invention to provide an optical recording and reproducing apparatus which does not allow an offset to be generated in the track-deviation detection signal even if its movable optical system suffers an optical-axis deviation (a vertical deviation), thereby making it possible to perform stable and accurate tracking control.

In accordance with this invention, there is provided an optical recording and reproducing apparatus for optically recording and reproducing information on and from a disk, comprising: a light source means for generating a parallel beam; a movable optical system adapted to condense the parallel beam from the light source means on a disk, to split the beam reflected by the disk into a first and a second beam, to spatially invert the second beam, and to move in the radial direction of the disk; a first split-beam detecting means having two light receiving surfaces which respectively receive the first beam; a second split-beam detecting means having two light receiving surfaces which respectively receive the second beam inverted in the movable optical system; and a control means adapted to effect tracking control by moving the movable optical system in the radial direction of the disk in accordance with respective detection signals output from the first and second split-beam detecting means.

BRIEF DESCRIPTION OF THE DRAWINGS

FIG. 7 is an optical-path diagram illustrating the operation of the second embodiment;

DESCRIPTION OF THE PREFERRED EMBODIMENTS

Embodiments of this invention will now be described with reference to the accompanying drawings.

Figure 1:
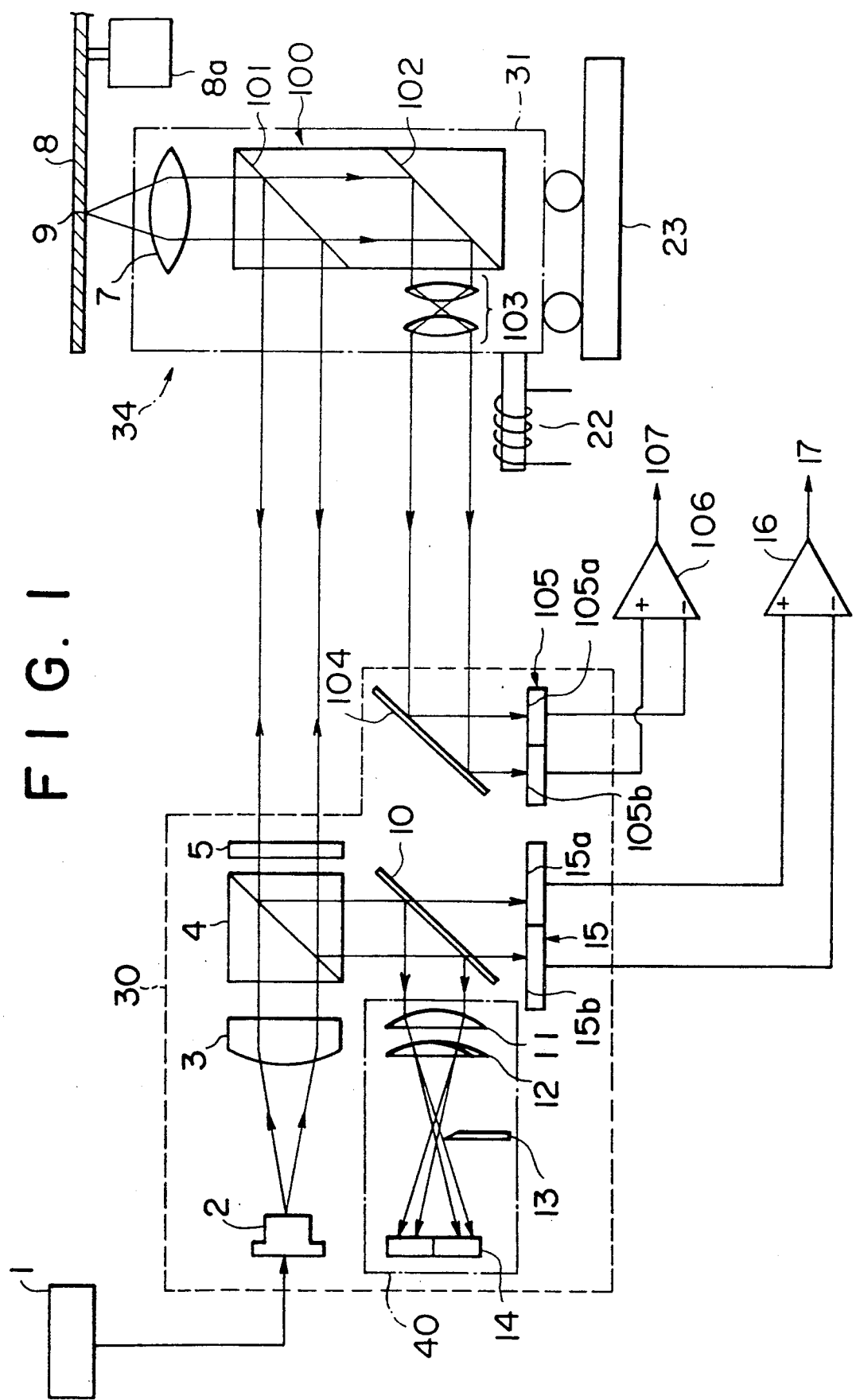
FIG. 1 is an optical-layout drawing showing an optical recording and reproducing apparatus in accordance with a first embodiment of this invention.

In the embodiment shown in FIG. 1, a semiconductor laser 2 is connected to a laser drive power source 1 in a stationary optical system 30. Arranged ahead of the semiconductor laser 2 are a collimating lens 3, a polarizing beam splitter 4, and a quarter-wavelength plate 5. Provided below the polarizing beam splitter 4 is a half mirror 10 having a beam-splitting function. A first split-beam detector 15 equipped with two light receiving surfaces 15a and 15b is arranged in the optical path of one of the beams obtained by the splitting action of the half mirror 10. A first differential circuit 16 is connected to the light receiving surfaces 15a and 15b of the first split-beam detector. Provided in the optical path of the other beam obtained by the splitting action of the half mirror 10 is a focal-deviation detecting section 40 which is composed of a convex lens 11, a cylindrical lens 12, a knife edge 13, and a third split-beam detector 14.

A movable optical system 34 is arranged ahead of the quarter-wavelength plate 5. The movable optical system 34 includes a stationary rail 23 and a carriage 31 which is moved along the stationary rail 23 and which is equipped with an objective lens 7, a composite prism 100 and an inverting optical system 103. The composite prism has a beam splitting surface 101 and a reflecting surface 102 which are substantially parallel to each other, the inverting optical system 103 being arranged in front of the reflecting surface 102. The objective lens 7 is situated above the beam splitting surface 101 of the composite prism 100 and faces a disk 8, which is held parallel to the stationary rail 23 and which is rotated by a rotating device 8a. The carriage 31 is further equipped with an electromagnetic driving device 22 for moving it along the stationary rail 23 in the radial direction of the disk 8.

A reflecting mirror 104 is arranged in the stationary optical system 30 in a position where it faces the inverting optical system 103 of the movable optical system 34. Provided in the optical path of the beam reflected by this reflecting mirror 104 is a second split-beam detector 105 equipped with two light receiving surfaces 105a and 105b, which are connected to a second differential circuit 106.

The operation of the first embodiment will now be described. First, the disk 8 is rotated by the rotating device 8a and, at the same time, the carriage 31 is moved along the rail 23, causing the objective lens 7 mounted on the carriage 31 to face the disk 8 at a desired position. In this condition, electricity is supplied to the semiconductor laser 2 from the laser drive power source 1, thereby driving the semiconductor laser 2.

The semiconductor laser 2 then emits a divergent beam, which is converted into a parallel beam by the collimating lens 3 and is transmitted through the polarizing beam splitter 4 as P-polarized light. The beam is then led through the quarter-wavelength plate 5 to the composite prism 100 of the movable optical system 34 and is reflected upwards by the beam splitting surface 101. It is then transmitted through the objective lens 7 so as to be condensed on the disk 8 as a condensation spot 9 having a diameter of about 1 μm. Recording or reproduction of information on or from the disk 8 is effected through this condensation spot 9.

Reflected by the disk 8, the beam is transmitted through the objective lens 7 again and becomes a parallel beam, which is led to the composite prism 100. Part of this parallel beam is reflected by the beam splitting surface 101 and impinges upon the quarter-wavelength plate 5 of the stationary optical system 30. As a result of having been transmitted through the quarter-wavelength plate 5 in both ways, the beam is reflected by the polarizing beam splitter 4, this time as S-polarized light, and is led to the half mirror 10. The beam which is transmitted through this half mirror 10 is received by the light receiving surfaces 15a and 15b of the first split-beam detector 15. The difference between the respective detection signals from these light receiving surfaces 15a and 15b is picked up by the first differential circuit 16 and is delivered as a first track-deviation detection signal 17.

That part of the beam reflected by the disk 8 which is transmitted through the beam splitting surface 101 of the composite prism 100 is reflected by the reflecting surface 102 and is led to the inverting optical system 103. The inverting optical system 103 is composed of two focusing lenses. The beam entering this inverting optical system 103 first forms an image and is then converted into a parallel beam again before being delivered. The beam is then reflected by the reflecting mirror 104 and is led to the light receiving surfaces 105a and 105b of the second split-beam detector 105. The difference between the respective detection signals from these light receiving surfaces 105a and 105b is picked up by the second differential circuit 106 and is delivered as a second track-deviation detection signal 107.

Next to be described, with reference to FIGS. 2, 3A to 3D, and 4A to 4E, will be the principle which makes it possible to obtain a track-deviation detection signal with no offset even if an optical-axis deviation is generated in the movable optical system 34.

Figure 2:
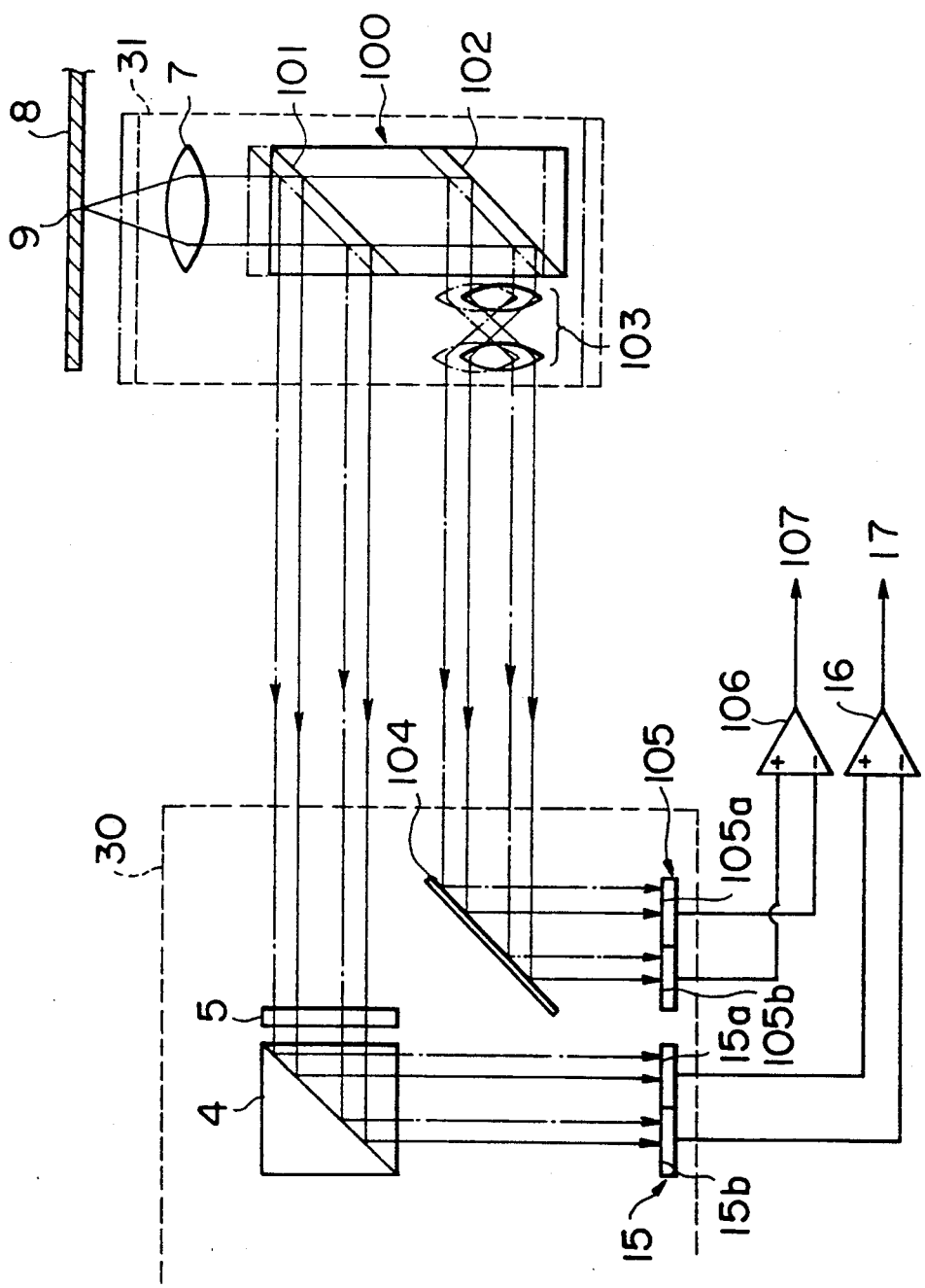
FIG. 2 is an optical-path diagram illustrating the operation of the first embodiment.
Figure 3A:
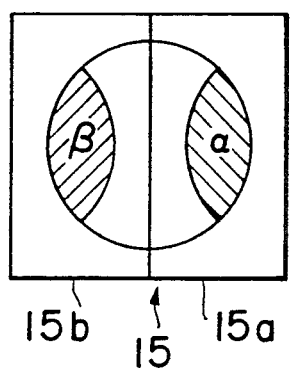
FIGS. 3A to 3D are diagrams showing the manner in which beams are received by the beam detectors of the first embodiment.
Figure 3B:
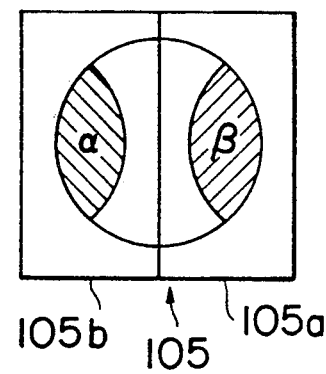
Figure 4A:
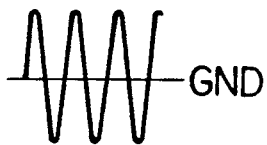
FIGS. 4A to 4E are waveform diagrams showing the track-deviation detection signal in the first embodiment.
Figure 4B:
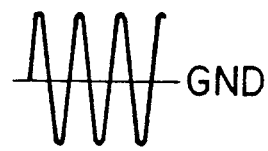

First, suppose, in FIG. 2, the carriage 31 of the movable optical system 34 is in the normal position, which is indicated by the dashed line. The composite prism 100 and the inverting lens system 103 are then in the positions indicated by the solid lines. In this state, the beams incident on the split-beam detectors 15 and 105 follow the courses indicated by the solid lines. FIGS. 3A and 3B show how the beams are received by the split-beam detectors 15 and 105. The shaded portions in FIGS. 3A and 3B represent the areas where a considerable quantity of light is diffracted due to the guide grooves of the disk 8. What should be noted here is the fact that the beam incident upon the second split-beam detector 105 forms an image in the inverting-lens system 103 prior to its impingement upon the split-beam detector 105. As a result, as shown in FIGS. 3A and 3B, the positional relationship between the areas α and β is inverted. The track-deviation detection signals 17 and 107 are obtained from these split-beam detectors 15 and 105 by means of the differential circuits 16 and 106, as shown in FIG. 2. However, to adjust the track-deviation polarity, the differential circuits 16 and 106 are designed as follows. For split-beam detector 15, the output of the light receiving surface 15b is subtracted from the output of the light receiving surface 15a, and for split-beam detector 105, the output of the light receiving surface 105a is subtracted from the output of the light receiving surface 105b. FIGS. 4A and 4B respectively show the track-deviation detection signals 17 and 107. In the normal state, the split-beam detectors 15 and 105 are so initialized that they have no offset, as shown in FIGS. 4A and 4B.

Figure 3C:
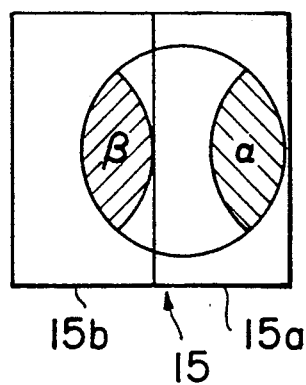
Figure 3D:
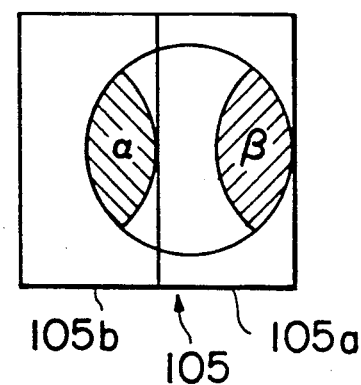

Next, suppose, in FIG. 2, the carriage 31 has been displaced upwards as indicated by the chain line while moving along the rail (not shown). This causes the composite prism 100 and the inverting lens 103 to be also displaced upwards as indicated by the chain line. As a result, the beams reflected by the disk 8 and incident upon the split-beam detectors 15 and 105 deviate laterally in the same direction, as indicated by the chain lines. Here, the respective deviations of these beams are the same. FIGS. 3C and 3D diagrammatically show how the beams are received in this state by the split-beam detectors 15 and 105.

Figure 4C:
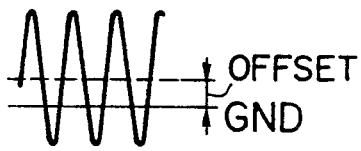
Figure 4D:
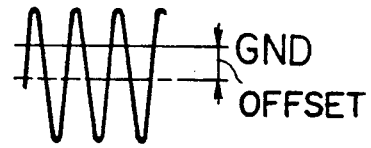

It should be noted here that, as stated above, the beam incident on the split-beam detector 105 has been inverted on the way so that when the carriage 31 deviates upwards, the change in the quantity of incident light differs between the split-beam detectors 15 and 105. On the split-beam detector 15, the quantity of light incident on the light receiving surface 15a increases, as shown in FIG. 3C, whereas on the split-beam detector 105, the quantity of light incident on the light receiving surface 105a increases, as shown in FIG. 3D. Thus, although offsets have been generated in the track-deviation detection signals 17 and 107, as shown in FIGS. 4C and 4D, the directions of these offsets are opposite to each other.

Figure 4E:
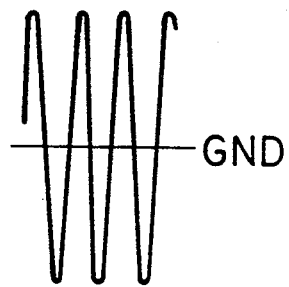
Figure 5A:
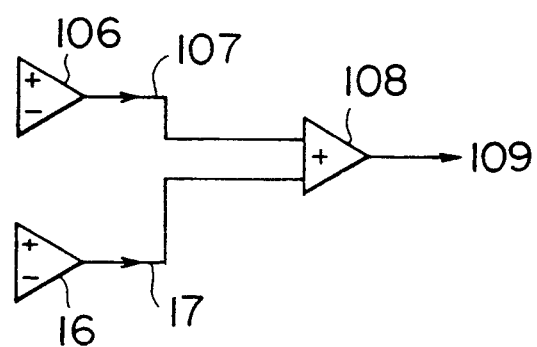
FIGS. 5A and 5B are circuit diagrams showing the calculating section of the first embodiment.
Figure 5B:
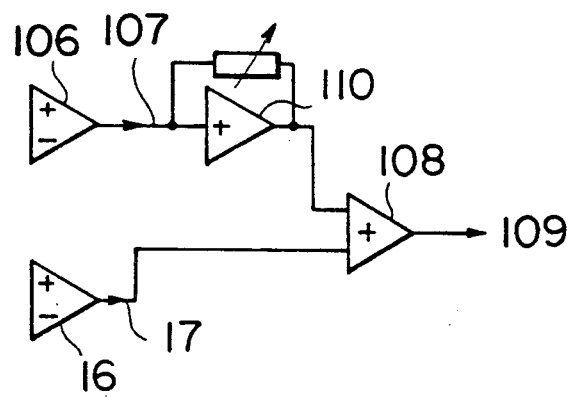

Accordingly, in the case where the quantities of light incident on the split-beam detectors 15 and 105 are equal to each other, in other words, in the case where the output amplitudes of the track-deviation detection signals 17 and 107 are the same, it is possible to cancel the offset components of the track-deviation detection signals 17 and 107 by simply adding them together by means of the adder 108 as shown in FIG. 5A, thereby obtaining a track-deviation detection signal 109 which includes no offset, as shown in FIG. 4E. If the quantities of light incident on the split-beam detectors 15 and 105 are not equal to each other, a similar effect can be obtained by equalizing the amplitudes of the detection signals 17 and 107 by means of a gain-adjusting amplifier 110, as shown in FIG. 5B, and adding them together by means of the adder 108. Whether the amplitudes of the track-deviation detection signals 17 and 107 are equal to each other is determined by the properties of the optical components used in the stationary optical system 30 and the movable optical system 34. Thus, the amplitudes of the detection signals 17 and 107 can be measured before selecting between the types of circuit configuration shown in FIGS. 5A and 5B.

The carriage 31 is moved along the rail 23 by the electromagnetic driving device 22, which is shown in FIG. 1, in such a manner as to cause the track-deviation detection signal 109 with no offset to become 0, thereby effecting tracking control. The tracking control may be performed by moving the objective lens 7 in the radial direction of the disk 8 by means of an actuator (not shown).

That part of the beam which is further reflected by the half mirror 10 after being reflected by the polarizing beam splitter 4 enters the focal-deviation detecting section 40, causing the third split-beam detector 14 to output a focal-deviation detection signal. On the basis of this focal-deviation detection signal, an actuator (not shown) appropriately moves the objective lens 7 of the movable optical system 34 in the direction of the optical axis, thus making it possible to effect the condensation spot 9 in such a manner that it is constantly in focus on the disk 8.

Figure 6:
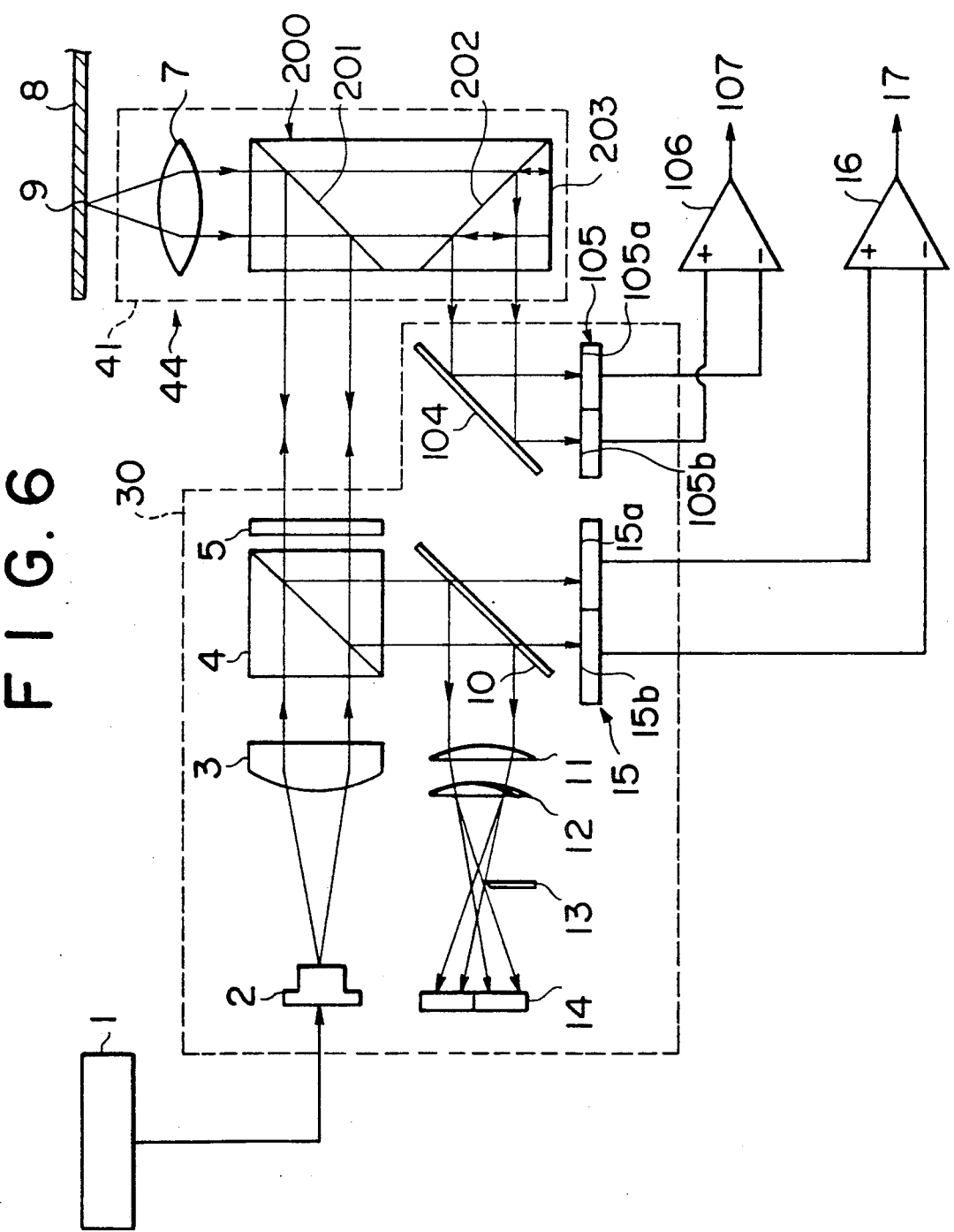
FIG. 6 is an optical-layout drawing showing a second embodiment of this invention.

FIG. 6 shows the optical layout of a second embodiment of this invention. The second embodiment is similar to the first embodiment except that it employs a movable optical system 44 which is different from the movable optical system 4 of the first embodiment. The movable optical system 44 includes a carriage 41 which is equipped with a composite prism 200 and an objective lens 7. The composite prism 200 is equipped with a first and a second beam splitting surface 201 and 202 which are substantially at right angles to each other as well as a total-reflection surface 203 arranged below the second beam splitting surface 202.

The function of the first beam splitting surface 201 of the composite prism 200 is identical to that of the beam splitting surface 101 of the composite prism 100. The beam splitting surface 201 reflects the parallel beam from the stationary optical system 30 and directs it to the disk 8 through the objective lens 7 and, at the same time, reflects and transmits the reflected light from the disk 8, splitting it into two different beams.

Of the reflected light from the disk 8, the beam which is transmitted through the first beam splitting surface 201 of the composite prism 200 reaches the second beam splitting surface 202. The component of this beam which is transmitted through the beam splitting surface 202 is reflected by the total-reflection surface 203 and is led to the second beam splitting surface 202 again. The beam reflected by the second beam splitting surface 202 is directed to the stationary optical system 30. Then, it is reflected by a reflecting mirror 104 and is led to the light receiving surfaces 105a and 105b of a second split-beam detector 105. The beam which reaches the reflecting mirror 104 has been inverted as a result of being reflected by the total-reflection surface 203 and the second beam splitting surface 202 of the composite prism 200.

Thus, in the case where the carriage 41 has been vertically displaced from its normal position, as indicated by the chain line of FIG. 7, the first and second differential circuits 16 and 106 output track-deviation detection signals 17 and 107 which include offsets of opposite directions. Accordingly, by using the circuit shown in FIG. 5A or FIG. 5B, a track-deviation detection signal 109 without any offset can be obtained.

Figure 8A:
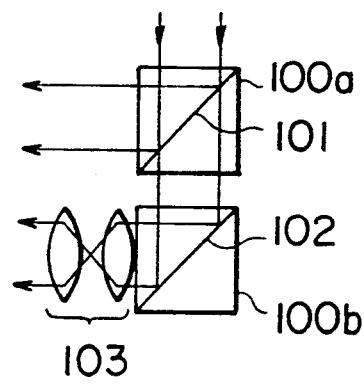
FIGS. 8A to 8D are diagrams showing parts of other embodiments of this invention.
Figure 8B:
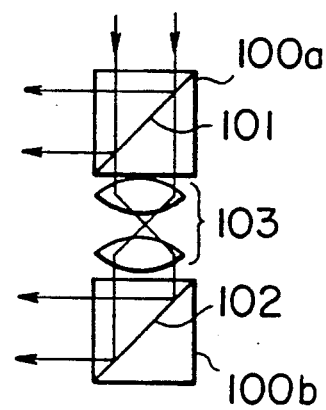

While in the first embodiment a composite prism 100 is used, it is also possible, as shown in FIG. 8A, to combine a prism 100a having a beam splitting surface 101 with a prism 100b having a reflecting surface 102. In that case, the inversion optical system 103 may be arranged between the two prisms 100a and 100b, as shown in FIG. 8B.

Figure 8C:
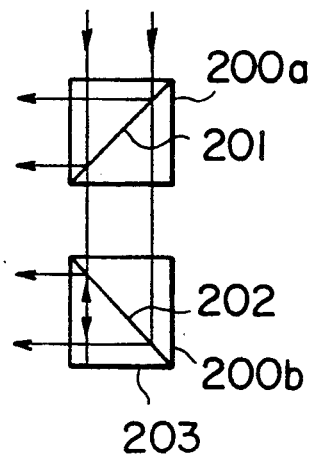
Figure 8D:
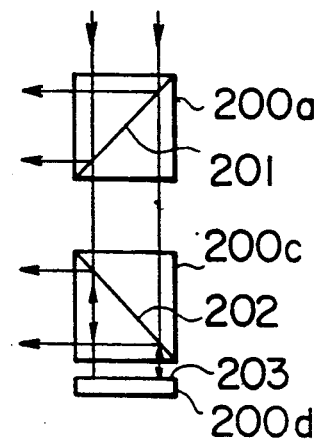
Figure 9:
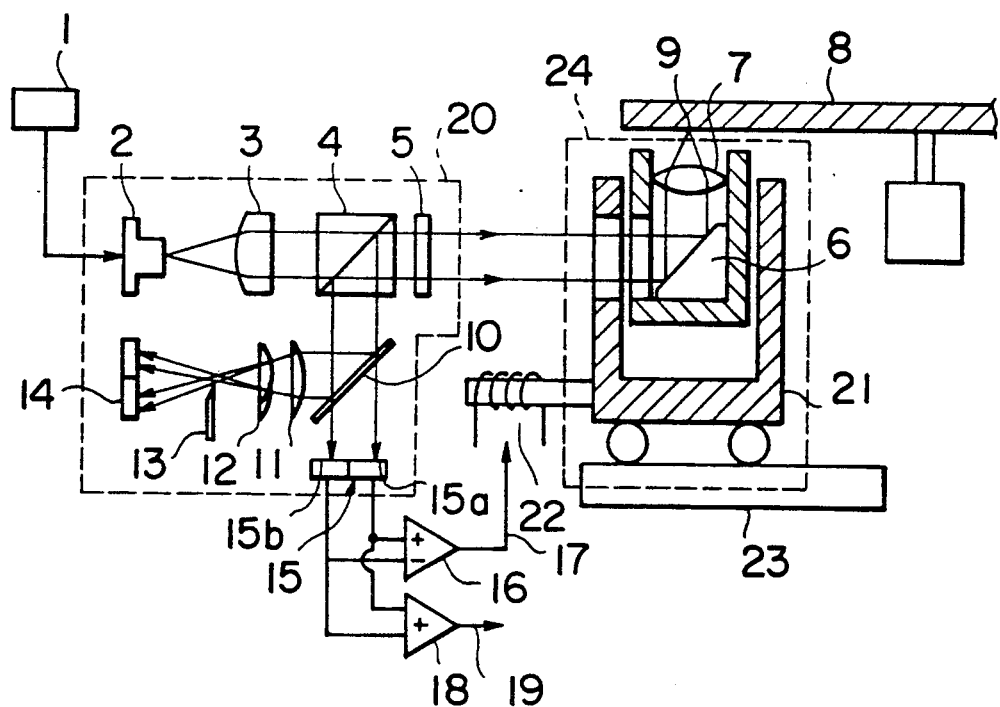
FIG. 9 is an optical-layout drawing showing a conventional optical recording and reproducing apparatus.
Figure 10A:
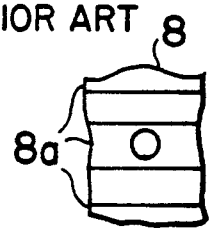
FIGS. 10A to 10D are optical-path diagrams showing the positional relationship between disk tracks and the condensation spot.
Figure 10E:
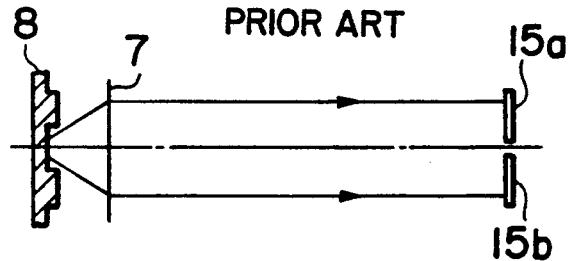
FIGS. 10E to 10H are optical path diagrams respectively corresponding to FIGS. 10A to 10D.
Figure 10B:
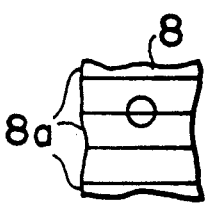
Figure 10F:
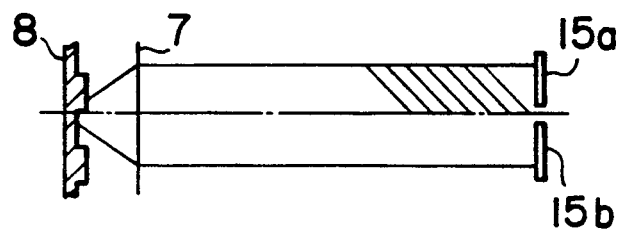
Figure 10C:
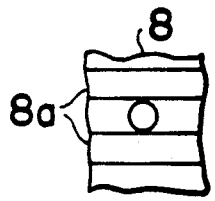
Figure 10G:
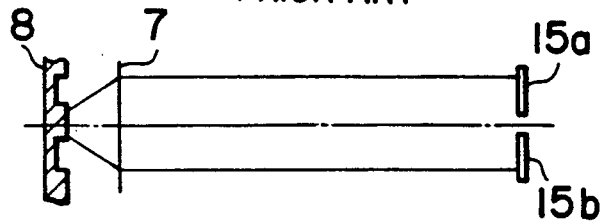
Figure 10D:
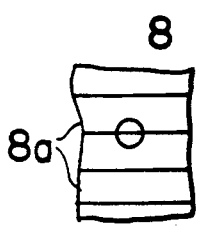
Figure 10H:
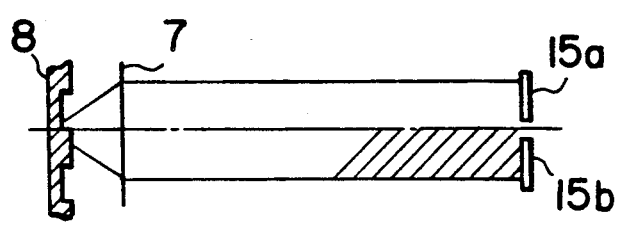
Figure 11:
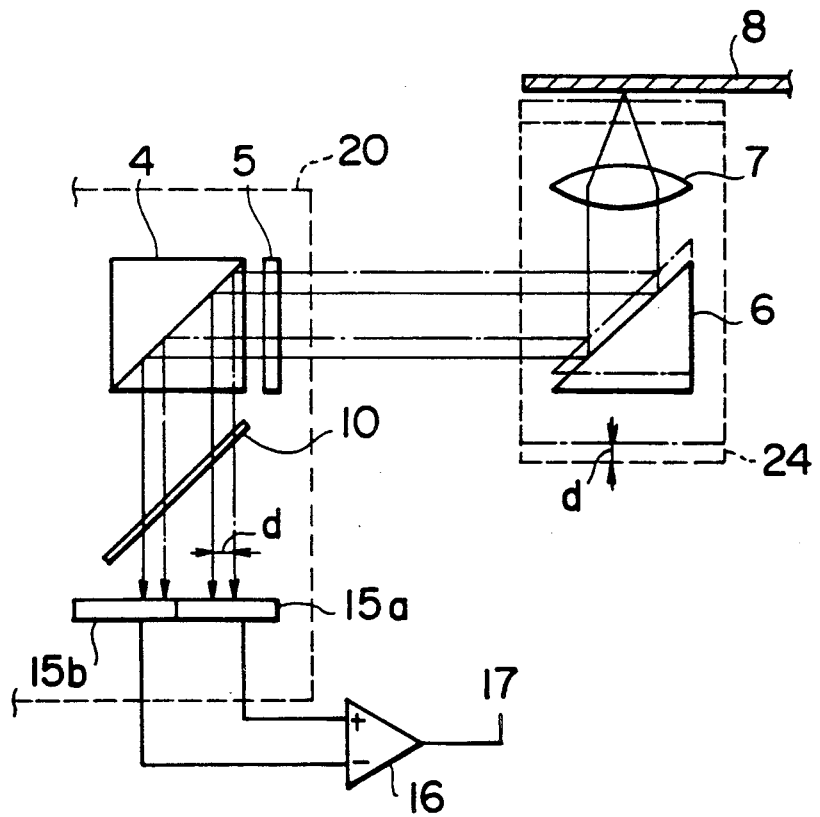
FIG. 11 is an optical path diagram illustrating the problem in the apparatus of FIG. 9.
Figure 12A:
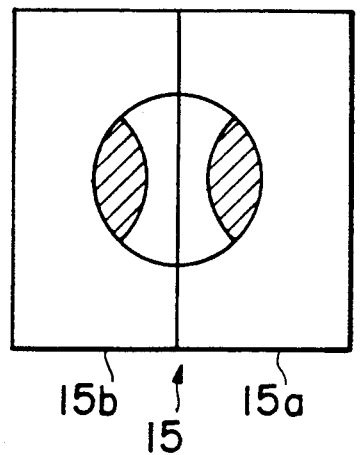
FIGS. 12A and 12B are diagrams showing how beams are received by the beam detectors of the apparatus shown in FIG. 9.
Figure 12B:
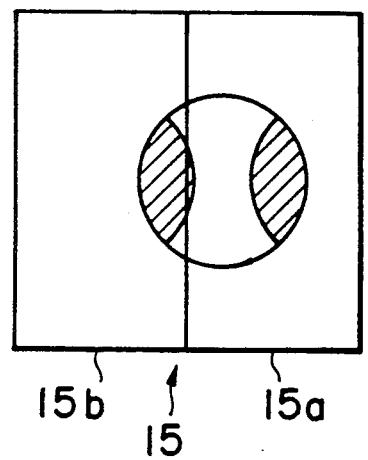
Figure 13A:
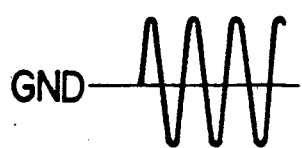
FIGS. 13A and 13B are waveform diagrams showing the track-deviation detecting signal in the apparatus shown in FIG. 9.
Figure 13B:
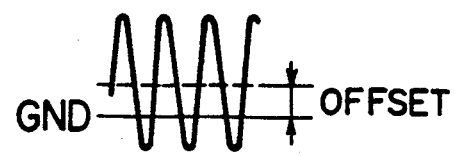

Likewise, in the second embodiment, a prism 200a having a first beam splitting surface 201 may be combined with a prism 200b having a second beam splitting surface 202 and a total-reflection surface 203, as shown in FIG. 8C, instead of using a composite prism 200. Further, as shown in FIG. 8D, the prism 200b may be divided into two prisms: a prism 200c having a second beam splitting surface 202 and a prism 200d having a total-reflection surface 203.

What is claimed is:

1. An optical recording and reproducing apparatus for optically recording and reproducing information on a disk comprising:

light source means for generating a parallel beam of light;

a movable optical system comprising means for condensing the parallel beam from the light source means on a disk, means for splitting a beam reflected by the disk into a first beam and a second beam, and inverting means for spatially inverting the second beam to obtain an inverted beam of parallel rays;

first light detecting means separated from the movable optical system and having first and second light receiving surfaces for receiving the first beam and generating first and second output signals corresponding to the light incident on the first and second light receiving surfaces;

second light detecting means separated from the movable optical system and having third and fourth light receiving surfaces for receiving the inverted beam and generating third and fourth output signals corresponding to the light incident on the third and fourth light receiving surfaces; and control means for controlling tracking by moving the movable optical system in the radial direction of the disk in accordance with the output signals from the first and second light detecting means.

2. An apparatus as claimed in claim 1, wherein the movable optical system includes a stationary rail, a carriage which is movable along the rail, an objective lens disposed on the carriage facing the disk, and splitting means disposed on the carriage for directing the parallel beam from the light source means to the objective lens, receiving reflected light from the disk through the objective lens, and splitting the reflected light into the first and the second beams.

3. An apparatus as claimed in claim 2, wherein the splitting means includes a prism having a beam splitting surface disposed so as to receive the reflected light from the disk.

4. An apparatus as claimed in claim 2, wherein the inverting means includes an inverting lens arranged along the optical axis of the second beam.

5. An optical recording and reproducing apparatus for optically recording and reproducing information on a disk comprising:

light source means for generating a parallel beam of light;

a movable optical system comprising a stationary rail, a carriage movable along the rail, an objective lens disposed on the carriage facing the disk for condensing the parallel beam from the light source means onto the disk, splitting means disposed on the carriage for directing the parallel beam from the light source means to the objective lens, receiving reflected light from the disk through the objective lens, and splitting the reflected light into first and second beams, and inverting means for spatially inverting the first and second beams to obtain an inverted beam, the inverting means including a beam splitting surface disposed to receive the second beam and a reflecting surface disposed to reflect the beam transmitted through the beam splitting surface at the beam splitting surface;

first light detecting means separated from the movable optical system and having first and second light receiving surfaces for receiving the first beam and generating first and second output signals corresponding to the light incident on the first and second light receiving surfaces;

second light detecting means separated from the movable optical system and having third and fourth light receiving surfaces for receiving the inverted beam and generating third and fourth output signals corresponding to the light incident on the third and fourth light receiving surfaces; and control means for controlling tracking by moving the movable optical system in the radial direction of the disk in accordance with the output signals from the first and second light detecting means.

6. An apparatus as claimed in claim 5 wherein the splitting means and the inverting means include a prism having a first beam splitting surface disposed to receive the reflected light from the disk, a second beam splitting surface arranged substantially at right angles to the first beam splitting surface and disposed to receive the light reflected by the disk and transmitted through the first beam splitting surface, and a reflecting surface disposed to reflect the beam transmitted through the second beam splitting surface at the second beam splitting surface.

7. An apparatus as claimed in claim 1, wherein the light source means includes a semiconductor laser and a collimating lens for converting a divergent beam from the semiconductor laser into a parallel beam.

8. An apparatus as claimed in claim 1, wherein the control means includes a first differential circuit responsive to the first light detecting means for calculating the difference between the first and second output signals of the first light detecting means, a second differential circuit responsive to the second light detecting means for calculating the difference between the third and fourth output signals of the second light detecting means, an adder responsive to the first and second differential circuits for adding the differences calculated by the first and second differential circuits, and an electromagnetic driving means for moving the movable optical system in accordance with the output of the adder.

9. An apparatus as claimed in claim 1, further comprising a focal-deviation detecting means for detecting focal deviation based on the first beam or the inverted beam.

10. An apparatus as claimed in claim 1, wherein each of the first beam and the inverted beam is a parallel beam.

11. An optical recording and reproducing apparatus comprising:

a light source for generating a beam of light;

a movable optical system comprising condensing means for condensing the beam from the light source onto a disk, and beam generating means for splitting a beam reflected from the disk into a first beam for tracking control and a second beam and inverting the second beam to produce an inverted beam of parallel rays for tracking control;

a first light detector comprising first and second light sensitive surface for generating first and second output signals in response to light incident thereon and disposed so that the first beam is incident thereon;

a second light detector comprising third and fourth light sensitive surface for generating third and fourth output signals in response to light incident thereon and disposed so that the inverted beam is incident thereon; and control means for controlling tracking by moving the movable optical system in a radial direction of the disk in response to the first through fourth output signals wherein the directions of travel of the first beam and the inverted beam with respect to the movable optical system are such that displacement of the movable optical system in a direction normal to the disk produces a first change in the difference between the first and second output signals and a second change in the difference between the third and fourth output signals, the first change being of opposite sign from the second change.

12. An optical recording and reproducing apparatus comprising:

a light source for generating a beam of light;

a movable optical system comprising condensing means for condensing the beam from the light source onto a disk, and beam generating means for splitting a beam reflected from the disk into a first beam for tracking control and a second beam and inverting the second beam to produce an inverted beam for tracking control, the beam generating means comprising a beam splitting surface disposed along the beam reflected from the disk, a reflecting surface disposed to receive light passing through the beam splitting surface, and an inverting lens disposed to receive light reflected from the reflecting surface;

a first light detector comprising first and second light sensitive surfaces for generating first and second output signals in response to light incident thereon and disposed so that the first beam is incident thereon;

a second light detector comprising third and fourth light sensitive surfaces for generating third and fourth output signals in response to light incident thereon and disposed so that the inverted beam is incident thereon; and control means for performing tracking control by moving the movable optical system in a radial direction of the disk based on the first through fourth output signals wherein the directions of travel of the first beam and the inverted beam with respect to the movable optical system are such that displacement of the movable optical system in a direction normal to the disk produces a first change in the difference between the first and second output signals and a second change in the difference between the third and fourth output signals, the first change being of opposite sign from the first change.

13. An apparatus as claimed in claim 12 wherein the beam generating means comprises a composite prism comprising the beam splitting surface and the reflecting surface.

14. An apparatus as claimed in claim 12 wherein the beam generating means further comprises means for forming light passing through the inverting lens into a parallel beam.

15. An optical recording and reproducing apparatus comprising:

a light source for generating a beam of light;

a movable optical system comprising condensing means for condensing the beam from the light source onto a disk, and beam generating means for splitting a beam reflected from the disk into a first beam for tracking control and a second beam and inverting the second beam to produce an inverted beam for tracking control, the beam generating means comprising a first beam splitting surface disposed along the beam reflected from the disk, a second beam splitting surface disposed to receive light passing through the first beam splitting surface, and a reflecting surface disposed to reflect light passing through the second beam splitting surface at the second beam splitting surface;

a first light detector comprising first and second light sensitive surface for generating first and second output signals corresponding to light incident thereon and disposed so that the first beam is incident thereon;

a second light detector comprising third and fourth light sensitive surfaces for generating third and fourth output signals corresponding to light incident thereon and disposed so that the inverted beam is incident thereon; and control means for controlling tracking by moving the movable optical system in a radial direction of the disk based on the first through fourth output signals, wherein the directions of travel of the first beam and the inverted beam with respect to the movable optical system are such that displacement of the movable optical system in a direction normal to the disk produces a first change in the difference between the first and second output signals and a second change in the difference between the third and fourth output signals, the first change being of opposite sign from the first change.

16. An apparatus as claimed in claim 15 wherein the beam generating means comprises a composite prism comprising the first beam splitting surface, the second beam splitting surface, and the reflecting surface.

17. An optical recording and reproducing apparatus comprising:

a light source for generating a beam of light;

a movable optical system comprising condensing means for condensing the beam from the light source onto a disk, and beam generating means for splitting a beam reflected from the disk into a first beam for tracking control and a second beam and inverting the second beam to produce an inverted beam for tracking control, the beam generating means comprising a beam splitting surface disposed along the beam reflected from the disk, a reflecting surface, and first and second lenses disposed between the beam splitting surface and the reflecting surface for inverting light passing through the beam splitting surface and forming the inverted light into a parallel beam directed at the reflecting surface;

a first light detector comprising first and second light sensitive surfaces for generating first and second output signals in response to light incident thereon and disposed so that the first beam is incident thereon;

a second light detector comprising third and fourth light sensitive surfaces for generating third and fourth output signals in response to light incident thereon and disposed so that the inverted beam is incident thereon; and control means for controlling tracking by moving the movable optical system in a radial direction of the disk based on the first through fourth output signals wherein the directions of travel of the first beam and the inverted beam with respect to the movable optical system are such that displacement of the movable optical system in a direction normal to the disk produces a first change in the difference between the first and second output signals and a second change in the difference between the third and fourth output signals, the first change being of opposite sign from the first change.

* * * * *